US011115215B2

(12) United States Patent
Gehrmann

(10) Patent No.: US 11,115,215 B2
(45) Date of Patent: Sep. 7, 2021

(54) METHODS AND DEVICES OF ENABLING AUTHENTICATION OF A USER OF A CLIENT DEVICE OVER A SECURE COMMUNICATION CHANNEL BASED ON BIOMETRIC DATA

(71) Applicant: Fingerprint Cards AB, Gothenburg (SE)

(72) Inventor: Christian Gehrmann, Lund (SE)

(73) Assignee: FINGERPRINT CARDS AB, Gothenburg (SE)

( * ) Notice: Subject to any disclaimer, the term of this patent is extended or adjusted under 35 U.S.C. 154(b) by 46 days.

(21) Appl. No.: 16/623,240

(22) PCT Filed: Jul. 5, 2018

(86) PCT No.: PCT/SE2018/050736
§ 371 (c)(1),
(2) Date: Dec. 16, 2019

(87) PCT Pub. No.: WO2019/022658
PCT Pub. Date: Jan. 31, 2019

(65) Prior Publication Data
US 2021/0152360 A1 May 20, 2021

(30) Foreign Application Priority Data
Jul. 27, 2017 (SE) .................................... 1750964-7

(51) Int. Cl.
*H04L 9/32* (2006.01)
*G06K 9/00* (2006.01)
*G06F 21/32* (2013.01)

(52) U.S. Cl.
CPC ............ *H04L 9/3231* (2013.01); *G06F 21/32* (2013.01); *G06K 9/00926* (2013.01);
(Continued)

(58) Field of Classification Search
CPC ... H04L 9/3231; H04L 9/3215; H04L 9/3234; H04L 9/3247; G06F 21/32; G06K 9/00926
See application file for complete search history.

(56) References Cited

U.S. PATENT DOCUMENTS 7,181,017 B1    2/2007  Nagel et al.
10,142,333 B1 * 11/2018  Griffin ................ H04L 63/0861
(Continued)

FOREIGN PATENT DOCUMENTS

CN       104321777 A    1/2015
EP         3043290 A1    7/2016
(Continued)

OTHER PUBLICATIONS

Armoogum et al, "A practical approach for secure biometric template storage for authentication", 2016, 2016 IEEE International Conference on Emerging Technology and Innovative Business Practices for the Transformation of Societies (EmergiTech), p. 1-5.*
(Continued)

*Primary Examiner* — Christopher A Revak
(74) *Attorney, Agent, or Firm* — RMCK Law Group, PLC

(57) ABSTRACT

In an aspect of the invention, a network node configured to enable authentication of a user of a client device based on biometric data captured by the client device is provided, which network node receives a request to authenticate a user of a client device, the authentication request comprising a user identifier, fetch at least one set of enrolled transformed biometric data corresponding to the user identifier and a secret feature transform key with which the biometric data was transformed at enrolment of the transformed biometric data at the network node, and submit the transformed
(Continued)

biometric data and the secret feature transform key over a secure communication channel to the client device.

15 Claims, 4 Drawing Sheets

(52) U.S. Cl.
CPC .......... *H04L 9/3215* (2013.01); *H04L 9/3234* (2013.01); *H04L 9/3247* (2013.01)

(56) References Cited

U.S. PATENT DOCUMENTS

| | | | | |
|---|---|---|---|---|
| 2007/0250718 | A1* | 10/2007 | Lee | H04L 9/0662 713/186 |
| 2009/0271634 | A1 | 10/2009 | Boult et al. | |
| 2010/0241595 | A1 | 9/2010 | Felsher | |
| 2011/0022851 | A1* | 1/2011 | Yokota | H04L 9/0894 713/189 |
| 2011/0037563 | A1 | 2/2011 | Choi et al. | |
| 2011/0047377 | A1 | 2/2011 | Allen et al. | |
| 2015/0046699 | A1 | 2/2015 | Benteo et al. | |
| 2015/0341349 | A1* | 11/2015 | Mandal | H04L 63/0861 726/7 |
| 2016/0164682 | A1 | 6/2016 | Hartloff et al. | |
| 2018/0091505 | A1* | 3/2018 | Farrell | H04L 63/0861 |
| 2020/0050794 | A1* | 2/2020 | Hassan | H04L 63/102 |
| 2020/0235932 | A1* | 7/2020 | Gehrmann | H04L 9/0825 |

FOREIGN PATENT DOCUMENTS

| | | |
|---|---|---|
| WO | 2009073144 A2 | 6/2009 |
| WO | 2009115611 A2 | 9/2009 |
| WO | 2016128906 A1 | 8/2016 |

OTHER PUBLICATIONS

Dang, T.K., et al., "Cancellable fuzzy vault with periodic transformation for biometric template", ET Biomet, Sep. 1, 2016, IEEE, Michael Faraday House, Six Hills Way, Stevenage, Herts. SG1 2AY, UK, vol. 5, nr. 3, p. 229-235. 7 pages.

International Search Report and Written Opinion for International Application No. PCT/SE2018/050736 dated Sep. 24, 2018, 11 pages.

Karthik, N., "BioSAKE: Biometrics-based secure authentication and key exchange", 2013 International Conference on Biometrics (ICB), Jun. 4, 2013, 8 pages.

Martinez, D., et al., "Secure crypto-biometric system for cloud computing", Securing Services on the Cloud (IWSSC), 2011 1st International Workshop on Sep. 6, 2011, 8 pages.

Sui, Yan, et al., "Biometrics-Based Authentication: A New Approach", Computer Communications and Networks (ICCCN), 2011 Proceedings of 20th International Conference, Jul. 31, 2011, 6 pages.

Vigila Soosai Antony Maria Celestin, et al., "Biometric security system over finite filed for mobile applications", IET Information Secu, Mar. 1, 2015, 8 pages.

Supplementary European Search Report dated Feb. 12, 2020 for European Application No. 18839117, 2 pages.

* cited by examiner

METHODS AND DEVICES OF ENABLING AUTHENTICATION OF A USER OF A CLIENT DEVICE OVER A SECURE COMMUNICATION CHANNEL BASED ON BIOMETRIC DATA

CROSS-REFERENCE TO RELATED APPLICATIONS

This application is a 371 U.S. National Stage of International Application No. PCT/SE2018/050736, filed Jul. 5, 2018, which claims priority to Swedish Patent Application No. 1750964-7, filed Jul. 27, 2017. The disclosures of each of the above applications are incorporated herein by reference in their entirety.

TECHNICAL FIELD

The invention relates to methods and devices of enabling authentication of a user of a client device over a secure communication channel based on biometric data.

BACKGROUND

Biometrics-based identification is a user-friendly way to securely authenticate human users. One major problem with biometric data when using it for identification purposes in distributed systems is that template biometric data must be available at a node in a computer system where the end-user is supposed to be identified. This constitute a major security design challenge in distributed computer system as this typically requires original, clear text biometric data to be stored at a central node and distributed in the system. Such solutions are very vulnerable to original biometric data compromise, and data compromised on one system may lead to a situation that the same biometric data is compromised on all other systems as well where the biometric data is used. Simply encrypting the biometric data will not solve this problem as the original biometric data must be available at the remote location during authentication.

Hence, there is a need to provide solutions that allow remote authentication based on biometric identification but at the same time provide protection of the original biometric data.

SUMMARY

An object of the present invention is to solve, or at least mitigate, this problem in the art and thus to provide an improved method of enabling authentication of a user of a client device over a secure communication channel based on biometric data.

This object is attained in a first aspect of the invention by a method performed by a client device of enabling authentication of a user of the client device based on biometric data captured by the client device. The method comprises capturing at least one set of biometric data of the user, transforming the at least one set of biometric data into non-invertible biometric data, and submitting an enrolment request comprising the transformed biometric data and a user identifier over a secure communication channel to a trusted network node.

This object is attained in a second aspect of the invention by a client device configured to enable authentication of a user of the client device based on biometric data captured by the client device. The client device comprises a biometric data sensing system comprising a biometric data sensor and a processing unit. The biometric data sensor is configured to capture at least one set of biometric data of the user, and the processing unit is configured to transform the at least one set of biometric data into non-invertible biometric data, and submit an enrolment request comprising the transformed biometric data and a user identifier over a secure communication channel to a trusted network node.

This object is attained in a third aspect of the invention by a method performed by a network node of enabling authentication of a user of a client device based on biometric data captured by the client device. The method comprises receiving, from the client device, an enrolment request comprising at least one set of transformed biometric data of the user along with a user identifier over a secure communication channel, and storing the received transformed biometric data, a secret feature transform key with which the biometric data was transformed at the client device, and the user identifier in a secure end-user repository.

This object is attained in a fourth aspect of the invention by a network node configured to enable authentication of a user of a client device based on biometric data captured by the client device. The trusted network node comprises a processing unit being configured to receive, from the client device, an enrolment request comprising at least one set of transformed biometric data of the user along with a user identifier over a secure communication channel, and store the received transformed biometric data, a secret feature transform key with which the biometric data was transformed at the client device, and the user identifier in a secure end-user repository.

This object is attained in a fifth aspect of the invention by a method performed by a network node of enabling authentication of a user of a client device based on biometric data captured by the client device. The method comprises receiving, from the client device, a request to authenticate a user of the client device, the authentication request comprising a user identifier, fetching, from the secure end-user repository, at least one set of enrolled transformed biometric data corresponding to the user identifier received from the client device and a secret feature transform key with which the biometric data was transformed at enrolment of the transformed biometric data at the network node, and submitting the transformed biometric data and the secret feature transform key over a secure communication channel to the client device.

This object is attained in a sixth aspect of the invention a network node configured to enable authentication of a user of a client device based on biometric data captured by the client device. The trusted network node comprising a processing unit is configured to receive, from the client device, a request to authenticate a user of the client device, the authentication request comprising a user identifier, fetch, from the secure end-user repository, at least one set of enrolled transformed biometric data corresponding to the user identifier received from the client device and a secret feature transform key with which the biometric data was transformed at enrolment of the transformed biometric data at the network node, and submit the transformed biometric data and the secret feature transform key over a secure communication channel to the client device.

This object is attained in a seventh aspect of the invention by a method performed by a client device of enabling authentication of a user of the client device based on biometric data enrolled at a trusted network node. The method comprises submitting, to the trusted network node, a request to authenticate the user of the client device, the authentication request comprising a user identifier, receiving, from the trusted network node, at least one set of transformed biometric data corresponding to the user identifier submitted with the authentication request and the secret feature transform key with which the received biometric data was transformed at enrolment of the transformed biometric data at the network node, capturing biometric data of the user, transforming the biometric data into non-invertible biometric data using the received feature transform key, and comparing the transformed biometric data with the at least one set of transformed biometric data received from the trusted network node, and it there is a match authenticating the user at the client device.

This object is attained in an eighth aspect of the invention by a client device configured to enable authentication of a user of the client device based on biometric data enrolled at a trusted network node. The client device comprises a biometric data sensing system comprises a biometric data sensor and a processing unit, the processing unit is configured to submit, to the trusted network node, a request to authenticate the user of the client device, the authentication request comprising a user identifier, and receive, from the trusted network node, at least one set of transformed biometric data corresponding to the user identifier submitted with the authentication request and the secret feature transform key with which the received biometric data was transformed at enrolment of the transformed biometric data at the network node. The biometric data sensor is configured to capture biometric data of the user. The processing unit is further configured to transform the biometric data into non-invertible biometric data using the received feature transform key, and compare the transformed biometric data with the at least one set of transformed biometric data received from the trusted network node, and it there is a match authenticate the user at the client device.

In brief, a first client device embodied e.g. in the form of a smart phone captures biometric data of a user, for instance using a fingerprint sensor. This biometric data is then protected at the smart phone using a feature transform and securely registered, or enrolled, with a remotely located trusted network node, which stores the protected biometric data in a secure central repository. Subsequently, the user will authenticate herself at a local computing station, i.e. a second client device, by having the computing station capture the biometric data of the user, protect the captured biometric data, and match the protected biometric data at the computing station with the protected biometric data that previously was registered with the trusted server, and now transmitted to the local computing station. Upon successful authentication, the user will be given access to the local computing station. Advantageously, a clear-text copy of the biometric data of the user never leaves the smart phone or the local computing station.

As an alternative, the user enrolls with the trusted server via the computing station as an alternative to using his/her smart phone. In such a scenario, both enrolment and authentication is performed by the same client device In more detail, the smart phone captures biometric data of the user and transforms the captured biometric data into a transformed biometric data set using a suitable feature transform scheme. The transform scheme used should produce transformed biometric data which is non-invertible, i.e. it should be infeasible for an attacker to reconstruct the original biometric data even with access to both a feature transformation key used in the feature transform and the transformed biometric data.

The smart phone submits the transformed biometric data over a secure channel, i.e. a communication channel being protected in terms of confidentiality and integrity, to the remotely located trusted server along with the secret feature transformation key (unless the key is preconfigured to be shared by the smart phone and the trusted server) and a user identifier associated with the transformed biometric data such that the transformed biometric data subsequently can be designated by the user.

The trusted server 300 stores the received transformed biometric data, the feature transformation key and the user identifier, referred to as an enrolment set, in a secure end-user repository, and the enrollment of the user with the trusted server is thereby completed.

It should be noted that the secure end-user repository typically contains a large number of enrollments; thousands of users may be enrolled with the trusted server, and a user potentially registers a plurality of transformed biometric data sets with the trusted server.

Advantageously, by using the feature transform scheme, the biometric data is not stored in the clear outside of the user's trusted client device.

Now, a user wishing to access the local computing station will need to authenticate herself with the trusted server with which she previously enrolled via the smart phone or the computing station.

Hence, the user enters a user identifier at the computing station, which is submitted to the trusted server in an authentication request over a secure channel.

Upon receiving the authentication request comprising the user identifier, the trusted server fetches one or more enrollment sets associated with this particular user identifier from the repository. These fetched enrollment sets are referred to as candidate enrollment sets, which are returned over the secure channel to the computing station.

Hence, a "pre-match" is advantageously performed at the trusted server utilizing the user identifier to fetch the adequate candidate enrollment sets, having as an effect that a largely reduced number of candidate enrollment sets will be considered by the computing station as compared to a scenario where the pre-match is not performed.

Thereafter, the computing station (being equipped with a suitable biometric sensor) derives the fingerprint data of the user, and uses the transformation key of each received candidate enrollment set to create a corresponding set of transformed biometric data.

Then, the computing station attempts to match each created set of transformed biometric data to the corresponding received transformed biometric data, and if at least one match can be found the user is authenticated and thus given access to the computing station.

In an embodiment, the local computing station digitally signs at least one of the sets of transformed biometric data, and the digitally signed set of transformed biometric data to the trusted server, which in its turn performs a verification process for the digitally signed set of transformed biometric data. If the verification is successful, the trusted server submitting an authentication grant to the client device. Advantageously, a higher level of security is provided by means of verification of the digital signature.

In a further embodiment, the trusted server associates each set of transformed biometric data stored in the secure end-user repository with an index number, which is also included in the enrolment sets and consequently in the candidate enrolment set(s) submitted to the local station. Subsequently, when receiving a digitally signed set of transformed biometric data from the local station, the corresponding index umber is included. The trusted server verifies that each index number received from the computing station complies with the previously submitted corresponding index number before an authentication grant can be issued. Advantageously, the verification of the index number further raises the security level of the system.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
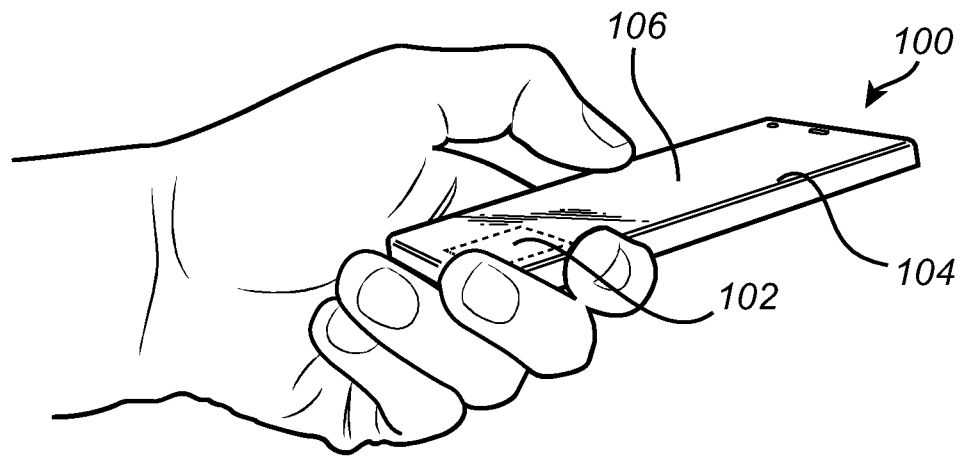
FIG. 1 shows an electronic device in the form of a smart phone in which the present invention may be implemented.

FIG. 1 shows a client device 100 in the form of a smart phone in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device utilizing fingerprint sensing.

Figure 2:
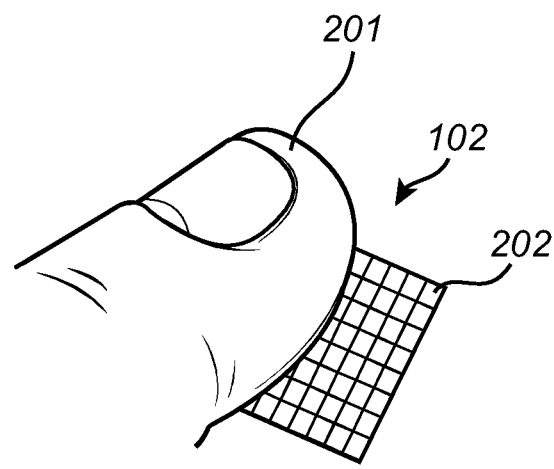
FIG. 2 shows a view of a fingerprint sensor onto which a user places the finger.

FIG. 2 illustrates a somewhat enlarged view of the fingerprint sensor 102 onto which a user places her finger 201.

In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
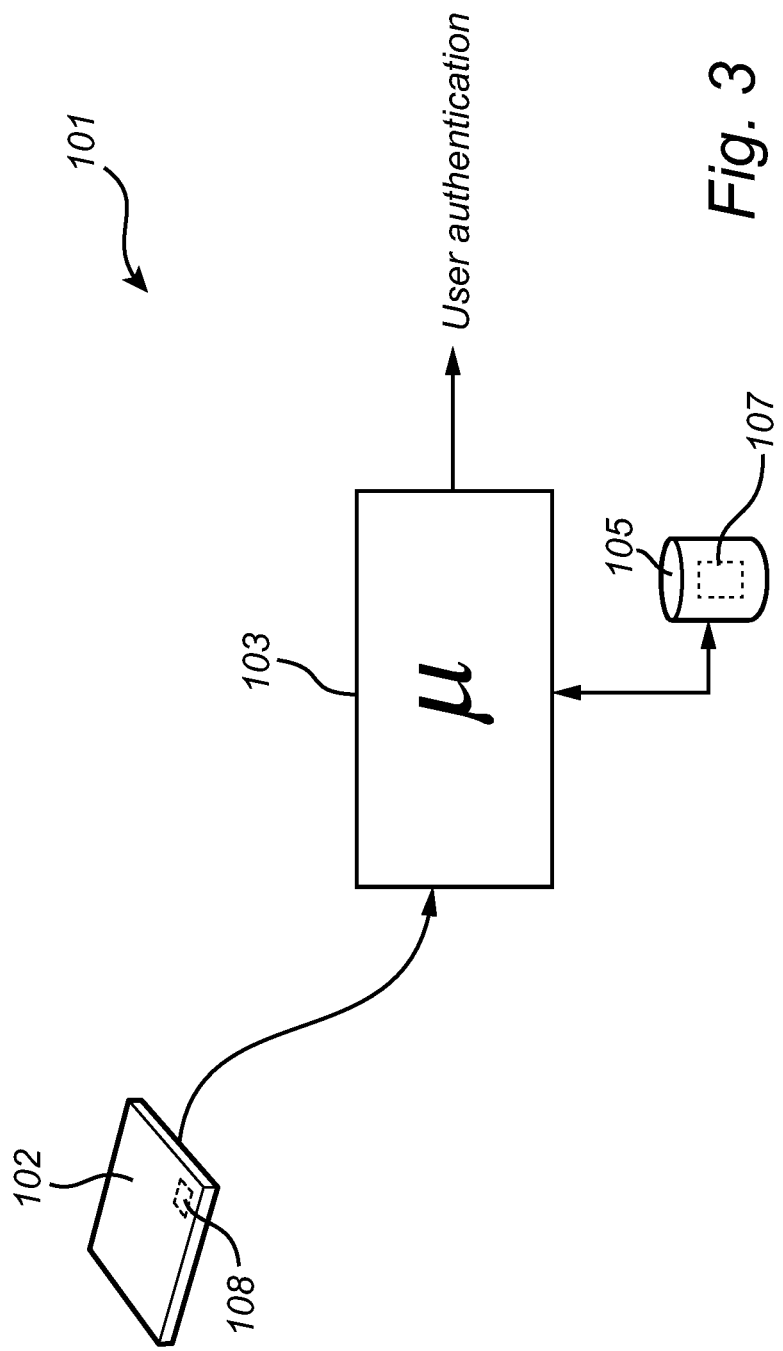
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
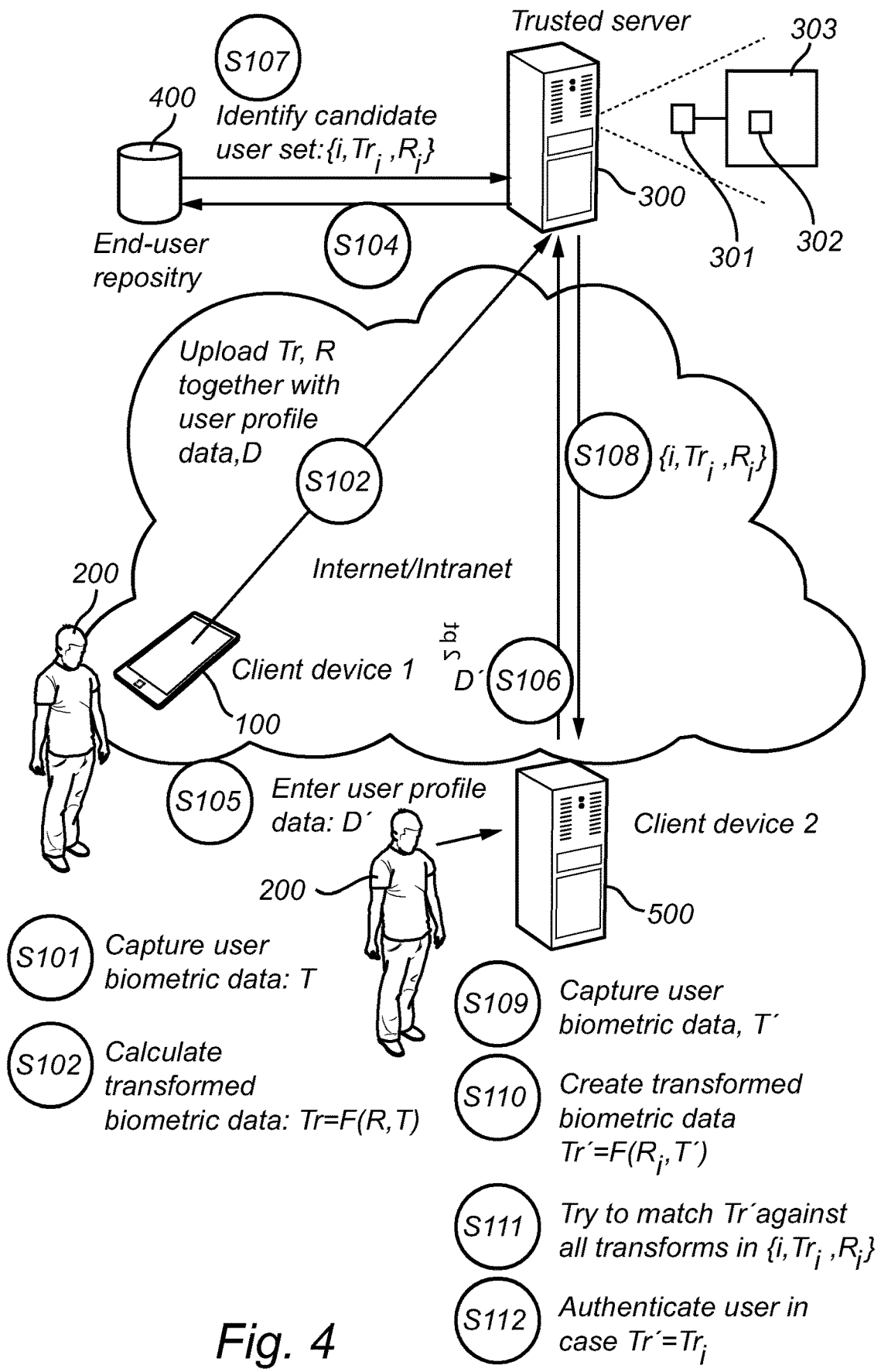
FIG. 4 illustrates a signalling diagram of enrolling transformed biometric data of a user at a trusted server and subsequently authenticating a user based on the enrolled transformed biometric data according to an embodiment.

FIG. 4 illustrates an embodiment of enabling authentication of user 200 of a second client device 500 over a secure communication channel based on biometric data captured by a first client device 100 and enrolled at a trusted network node 300.

In brief, a client device 100 embodied e.g. in the form of a smart phone captures biometric data of a user 200, e.g. in the manner described with reference to FIGS. 1-3. This biometric data is then protected at the smart phone and securely registered, or enrolled, with a remotely located trusted network node, embodied in the form of a server 300, which stores the protected biometric data in a secure central repository 400. Subsequently, the user 200 will authenticate herself at a local computing station 500, i.e. a second client device, by having the computing station 500 capture the biometric data of the user, protect the captured biometric data, and match the protected biometric data at the computing station 500 with the protected biometric data that previously was registered with the trusted server 300, and now transmitted to the local computing station 500. Upon successful authentication, the user 200 will be given access to the local computing station 500. It is noted that a clear-text copy of the biometric data of the user 200 never leaves the smart phone 100 or the local computing station 500.

As previously mentioned, in many situations a need arises to securely identify an end-user at a local computing station 500. This can for instance be a medical system station in a hospital or similar. In this scenario, the local station 500 as such is considered trusted, but a "proof" may be required that only a legitimate user is allowed to access the station 500. This can be solved using traditional login procedures using username and passwords, hardware tokens, or biometrics such as fingerprints.

However, traditional biometric identification solutions typically require that complete biometric profiles of all authorized users are stored in a central repository 400 of a trusted server 300 where efficient template-matching is performed to authenticate users. Biometric profiles are very privacy sensitive and one would like to avoid storing biometric profiles in clear text in any central location.

Hence, authorized medical personnel such as doctors and nurses are authenticated to local computing stations using biometrics managed by the trusted server 300 and stored in the central repository 400. The medical personnel can for instance register, or enroll, to the trusted server 300 using their smart phone 100 with biometric data sensing capabilities and then login to any of the many local computing stations distributed over the hospital premises using local biometrics readers directly attached to the distributed computing stations 500. It is also possible that the users register with the trusted server 300 via any one of the local computing stations 500 as an alternative to using their smart phone 100.

With reference to FIG. 4, the smart phone 100 captures biometric data T of the user 200 in step S101, using e.g. a fingerprint sensor as described with reference to FIGS. 1-3.

In step S102, the smart phone 100 transforms the captured biometric data T into a transformed biometric data set Tr, using a suitable feature transform scheme.

This may for instance be performed using a secret feature transformation key R having been generated at the smart phone 100 by means of an appropriate pseudorandom function (PRF). Alternatively, the smart phone 100 is preconfigured with the secret feature transformation key R shared with the trusted server 300.

The transform scheme used should produce transformed biometric data denoted Tr=F(R, T) which is non-invertible, i.e. it should be infeasible for an attacker to reconstruct the original biometric data T even with access to both the feature transformation key R and the transformed biometric data Tr.

A number of different transform functions F may be envisaged, such as cartesian, polar or functional transformations, or a non-invertible transformation function built upon an approximation Message Authentication Code (MAC) scheme.

The smart phone 100 submits in step S103 the transformed biometric data Tr over a secure channel, i.e. a communication channel being protected in terms of confidentiality and integrity, e.g. via the Internet, to the remotely located trusted server 300 along with the secret feature transformation key R (unless R is preconfigured to be shared by the smart phone 100 and the trusted server 300) and a user identifier D associated with the transformed biometric data Tr such that the transformed biometric data Tr subsequently can be designated by the user 200.

The trusted server 300 stores the received transformed biometric data Tr, the feature transformation key R and the user identifier D, referred to as an enrolment set, in a secure end-user repository 400 in step S104, located either locally at or remote from the remote server 300, and the enrollment of the user 200 with the trusted server 300 is thereby completed.

It should be noted that the secure end-user repository 400 typically contains a large number of enrollments; thousands of users may be enrolled with the trusted server 300, and a user potentially registers a plurality of transformed biometric data sets with the trusted server 300, even using different feature transformation keys R for each transformed biometric data set.

Hence, for each registered transformed biometric data set Tr and feature transformation key R, an index i is optionally created by the trusted server 300, thereby resulting in an enrollment set $\{i, Tr_i, R_i\}_D$ associated with the user identifier D, which set is stored in the secure end-user repository 400 in step S104. As a result, if the user 100 has registered for instance five biometric profiles, each has a unique index number i associated with the particular user identifier. Should the user 100 register only one single biometric profile, it is possible that the user identifier D itself is used as an index i for the enrollment set. In such case, the user identifier D would have to be unique such that the corresponding enrollment set may be distinguished at the trusted server 300.

It can further be envisaged that a number of enrollment sets are associated with the user identifier D without incorporating an index number i.

Advantageously, by using the feature transform scheme, the biometric data T is not stored in the clear outside of the user's trusted client device, i.e. the smart phone 100.

Now, a user wishing to access the local computing station 500 will need to authenticate herself with the trusted server 300 with which she previously has enrolled.

Hence, the user (which in this particular example is assumed to be the user 200 that enrolled with the trusted server in steps S101-S104) enters a user identifier D' at the computing station 500 in step S105, which is submitted to the trusted server 300 in an authentication request in step S106 over a secure channel.

Upon receiving the authentication request comprising the user identifier D', the trusted server 300 fetches one or more enrollment sets associated with this particular user as identified by D' from the repository 400 in step S107. These fetched enrollment sets are referred to as candidate enrollment sets, which are returned over the secure channel to the computing station 500 in step S108. Hence, a "pre-match" is advantageously performed at the trusted server 300 utilizing the user identifier D' to fetch the adequate candidate enrollment sets, having as an effect that a largely reduced number of candidate enrollment sets will be considered by the computing station 500 as compared to a scenario where the pre-match is not performed.

Thereafter, the computing station 500 (being equipped with a suitable biometric sensor) derives the fingerprint data T' of the user 200 in step S109, and uses the transformation key $R_i$ of each candidate enrollment set received in step S108 to create a corresponding set of transformed biometric data Tr'=F($R_i$, T') in step S10. It is noted that the feature transformation key $R_i$ may be the same or different for each enrollment set.

As is understood, steps S109 and S110 may well be performed at an earlier stage, for instance in connection to step S105 where the user 200 enters a user identifier D', or even before the user enters her user identifier D' in step S105.

Then, the computing station 500 attempts to match each created set of transformed biometric data Tr' to the corresponding received transformed biometric data $Tr_i$ in step S111, and if at least one match can be found the user 200 is authenticated in step S112 and thus given access to the computing station 500, or to some protected data stored at the station.

Alternatively, in an embodiment providing for stricter security, in case the user 200 has enrolled a plurality of enrollment sets with the trusted server 300, a match must be attained for more than one enrollment set. In case even stricter security is required, it can even be envisaged that all sets of transformed biometric data must match.

Advantageously, as can be concluded from the above, no clear text biometric data is stored at the trusted server 300, which considerable can increase a user's trust in using the system.

With reference to FIG. 4, the steps of the method performed by the remote server 300 are in practice performed by a processing unit 301 embodied in the form of one or more microprocessors arranged to execute a computer program 302 downloaded to a storage medium 303 associated with the microprocessor, such as a Random Access Memory (RAM), a Flash memory or a hard disk drive. The processing unit 301 is arranged to cause the remote server 300 to carry out the method according to embodiments when the appropriate computer program 302 comprising computer-executable instructions is downloaded to the storage medium 303 and executed by the processing unit 301. The storage medium 303 may also be a computer program product comprising the computer program 302. Alternatively, the computer program 302 may be transferred to the storage medium 303 by means of a suitable computer program product, such as a Digital Versatile Disc (DVD) or a memory stick. As a further alternative, the computer program 302 may be downloaded to the storage medium 303 over a network. The processing unit 301 may alternatively be embodied in the form of a digital signal processor (DSP), an application specific integrated circuit (ASIC), a field-programmable gate array (FPGA), a complex programmable logic device (CPLD), etc.

Figure 5:
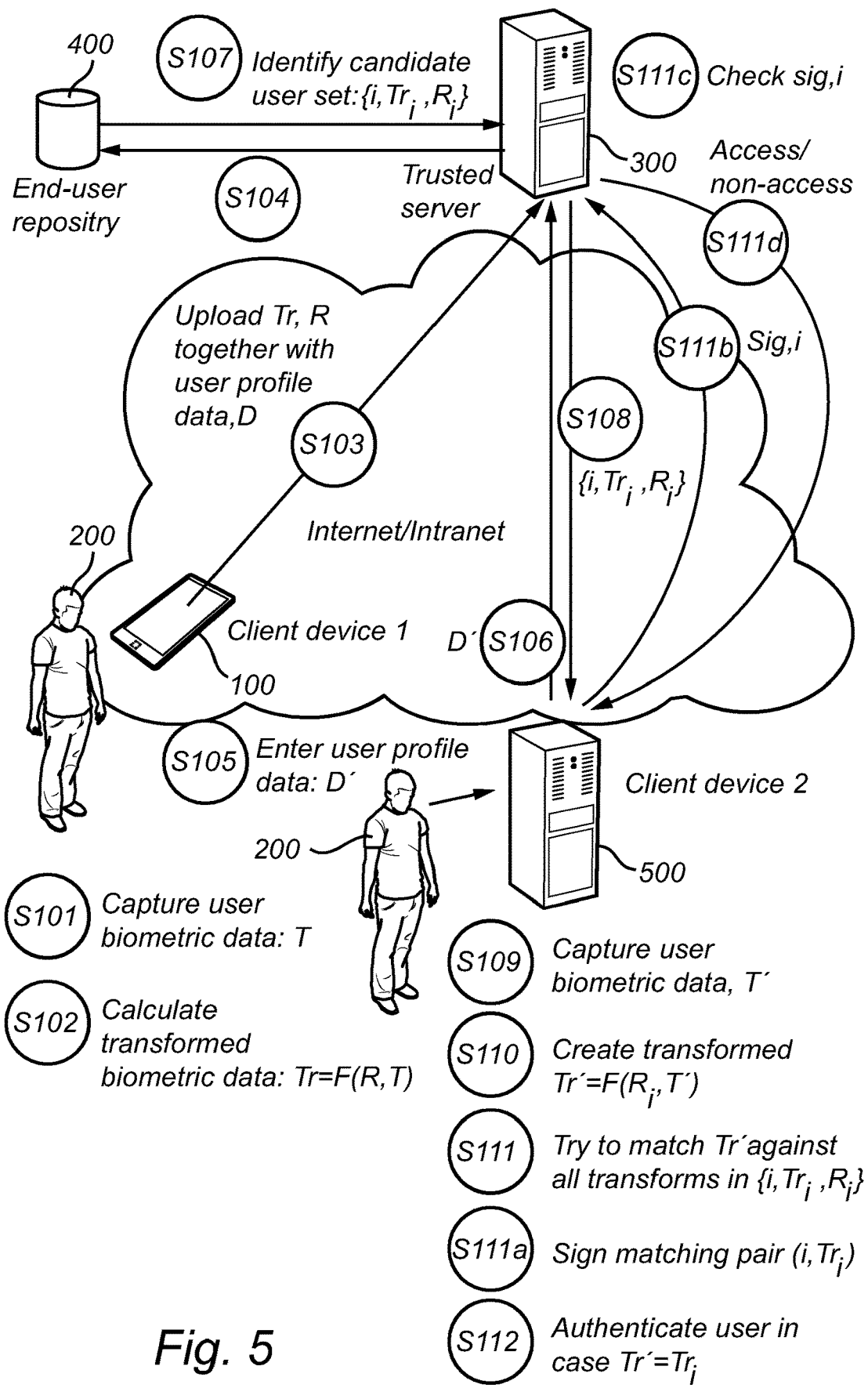
FIG. 5 illustrates a signalling diagram of enrolling transformed biometric data of a user at a trusted server and subsequently authenticating a user based on the enrolled transformed biometric data according to another embodiment.

FIG. 5 illustrates a further embodiment of enabling authentication of user 200 of a second client device 500 over a secure communication channel based on biometric data captured by a first client device 100 and enrolled at a trusted network node 300.

Now, in this embodiment, after the computing station 500 matches the set of transformed biometric data Tr' created in step S110 to the corresponding received set of transformed biometric data $Tr_i$ in step S111, the computing station proceeds to step S111a where it digitally signs the transformed biometric data $Tr_i$ and corresponding index i for which there is a match, which is denoted sig=SIG(Pr, i||$Tr_i$) where || denotes concatenation.

Pr is a private key of an asymmetric key pair shared with the trusted server 300, where a corresponding public key is denoted Pu. The computing station 500 is typically preconfigured with the asymmetric key pair.

It is further envisaged that the signature may be extended with a matching score M indicating how well two transformed biometric data sets match, resulting in sig=SIG(Pr, M||i||$Tr_i$).

Thereafter, in step S111b, sig and optionally i (and the matching score M, in case the signature comprises M) is submitted to the trusted server 300 over the secure channel, which in this turn verifies sig using the public key Pu, and optionally also verifies the index i in step 111c, and in case the digital signature sig (and optionally i) is successfully verified, the trusted server 300 returns an authentication grant in step S111d. The matching score M may be used to determine at the trusted server 300 if the matching is good enough. If not, the user may not be authenticated, or may be required to enter a personal code such as a pin code, or a password, at the local station.

Hence, the trusted server 300 may verify that the unique index i indeed exists for the database held in the repository 400, and that this particular index was part of the candidate enrollment set(s) submitted in step S108. Upon receiving the authentication grant, the local computing station authenticates the user 200 in step S112. Advantageously, a higher level of security is provided by means of verification of the digital signature sig.

Further, in the embodiment where an index number i is associated with each enrollment set for a particular user as identified with user identifier D, an even higher level of security is provided since not only the digital signature sig is verified but also the index number i (and potentially even the matching score M).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node of enabling authentication of a user of a client device based on biometric data captured by the client device, comprising:
   receiving, from the client device, a request to authenticate a user of the client device, the authentication request comprising a user identifier;
   fetching, from the secure end-user repository, at least one set of enrolled transformed biometric data corresponding to the user identifier received from the client device and a secret feature transform key with which the biometric data was transformed at enrolment of the transformed biometric data at the network node; and submitting the transformed biometric data and the secret feature transform key over a secure communication channel to the client device, wherein the submitted transformed biometric data is compared at the client device with biometric data being captured at the client device and transformed with the secret feature transform key and if there is a match, the user is authenticated.

2. The method of claim 1, wherein a plurality of sets of enrolled transformed biometric data corresponding to the user identifier received from the client device are fetched from the secure end-user repository and submitted to the client device.

3. The method of claim 1, further comprising:
receiving, from the client device, at least one digitally signed set of transformed biometric data;
verifying said at least one digitally signed set of transformed biometric data; and if the verification is successful:
submitting an authentication grant to the client device.

4. The method of claim 1, further comprising:
associating each set of transformed biometric data stored in the secure end-user repository with an index number, wherein the submitting of the plurality of sets of transformed biometric data corresponding to the user identifier received from the client device further comprises:
submitting the index number associated with each set of transformed biometric data, wherein the receiving, from the client device, of at least one digitally signed set of transformed biometric data further comprises:
receiving an index number for each digitally signed set of transformed biometric data; and the verifying of said at least one digitally signed set of transformed biometric data further comprises:
verifying that each index number received from the client device complies with the previously submitted corresponding index number for each set of transformed biometric data.

5. A computer program product comprising a non-transitory computer readable medium, the computer readable medium having a computer program embodied thereon, the computer program comprising computer-executable instructions for causing a trusted network node to perform the method of claim 1 when the computer-executable instructions are executed on a processing unit included in the trusted network node.

6. A method performed by a client device of enabling authentication of a user of the client device based on biometric data enrolled at a trusted network node, comprising:
submitting, to the trusted network node, a request to authenticate the user of the client device, the authentication request comprising a user identifier;
receiving, from the trusted network node, at least one set of transformed biometric data corresponding to the user identifier submitted with the authentication request and the secret feature transform key with which the received biometric data was transformed at enrolment of the transformed biometric data at the network node;
capturing biometric data of the user;
transforming the biometric data into non-invertible biometric data using the received feature transform key; and
comparing the transformed biometric data with the at least one set of transformed biometric data received from the trusted network node; and if there is a match:
authenticating the user at the client device.

7. The method of claim 6, wherein a plurality of sets of transformed biometric data are received from the trusted network node and compared to the biometric data transformed at the client device, wherein the user is authenticated if the biometric data transformed at the client device matches each one of the sets of transformed biometric data received from the trusted network node.

8. The method of claim 6, further comprising:
digitally signing the at least one received set of transformed biometric data for which there is a match;
submitting the digitally signed biometric data to the trusted network node;
receiving, from the trusted network node in case the trusted network node successfully verifies the digitally signed biometric data, an authentication grant, wherein the user is authenticated at the client device.

9. The method of claim 8, wherein the receiving of the plurality of sets of transformed biometric data corresponding to the user identifier received from the client device (500) further comprises:
receiving an index number associated with each set of transformed biometric data, and wherein the submitting of at least one digitally signed set of transformed biometric data further comprises:
submitting the index number for each digitally signed set of transformed biometric data.

10. The method of claim 6, wherein the client device requesting authentication is different from the client device requesting enrolment.

11. A computer program product comprising a non-transitory computer readable medium, the computer readable medium having a computer program embodied thereon, the computer program comprising computer-executable instructions for causing a biometric data sensing system to perform the method of claim 6 when the computer-executable instructions are executed on a processing unit included in the biometric data sensing system.

12. A network node configured to enable authentication of a user of a client device based on biometric data captured by the client device, the trusted network node comprising a processing unit being configured to:
receive, from the client device, a request to authenticate a user of the client device, the authentication request comprising a user identifier;
fetch, from the secure end-user repository, at least one set of enrolled transformed biometric data corresponding to the user identifier received from the client device and a secret feature transform key with which the biometric data was transformed at enrolment of the transformed biometric data at the network node; and
submit the transformed biometric data and the secret feature transform key over a secure communication channel to the client device, wherein the submitted transformed biometric data is compared at the client device with biometric data being captured at the client device and transformed with the secret feature transform key and if there is a match, the user is authenticated.

13. The network node of claim 12, being configured to fetch a plurality of sets of enrolled transformed biometric data corresponding to the user identifier received from the client device are from the secure end-user repository and to submit the fetched plurality of sets of enrolled transformed biometric data to the client device.

14. The network node of claim 12, the processing unit further being configured to:
- receive, from the client device, at least one digitally signed set of transformed biometric data;
- verify said at least one digitally signed set of transformed biometric data; and if the verification is successful:
- submit an authentication grant to the client device.

15. The network node of claim 12, the processing unit further being configured to:
- associate each set of transformed biometric data stored in the secure end-user repository with an index number, and further being configured to, when submitting the plurality of sets of transformed biometric data corresponding to the user identifier received from the client device:
- submit the index number associated with each set of transformed biometric data, and further being configured to, when receiving the at least one digitally signed set of transformed biometric data from the client device:
- receive an index number for each digitally signed set of transformed biometric data; and further being configured to, when verifying said at least one digitally signed set of transformed biometric data:
- verify that each index number received from the client device complies with the previously submitted corresponding index number for each set of transformed biometric data.

* * * * *